United States Patent [19]

Okasaka

[11] 4,096,440
[45] Jun. 20, 1978

[54] CONTROL SYSTEM FOR MOBILE RADIO COMMUNICATION

[75] Inventor: Sadaatsu Okasaka, Yokohama, Japan

[73] Assignee: Nippon Telegraph and Telephone Public Corporation, Japan

[21] Appl. No.: 790,044

[22] Filed: Apr. 22, 1977

[30] Foreign Application Priority Data

Apr. 26, 1976 Japan .................................. 51-47384

[51] Int. Cl.² .............................................. H04B 1/00
[52] U.S. Cl. ........................................ 325/53; 325/55; 325/64; 179/2 E
[58] Field of Search .................................. 325/51–55, 325/57, 64, 4; 179/41 A, 2 E; 343/176, 177, 179

[56] References Cited

U.S. PATENT DOCUMENTS

| 3,173,996 | 3/1965 | Rypinski, Jr. | 325/55 |
| 3,376,509 | 4/1968 | Willcox et al. | 325/64 |
| 3,582,787 | 6/1971 | Muller | 325/53 |
| 3,663,762 | 5/1972 | Joel, Jr. | 325/53 |
| 3,819,872 | 6/1974 | Hamrick | 325/55 |
| 3,913,017 | 10/1975 | Imaseki | 325/52 |

Primary Examiner—Robert L. Griffin
Assistant Examiner—Jin F. Ng
Attorney, Agent, or Firm—Robert E. Burns; Emmanuel J. Lobato; Bruce L. Adams

[57] ABSTRACT

A control system for mobile radio communication, in which the whole service area is composed of a plurality of small radio service zones in each of which communication is sufficiently possible with the transmitting power of any of mobile stations belonging to the service zone, a base station of each of the small radio service zones and a control station for controlling the whole service area are interconnected through a binary code transmission line, and in order to prevent simultaneous transmission of the control signal from a plurality of mobile stations when the mobile stations in the whole service area achieve transmission and reception of the control signal between each of them and the control station over a common control channel, the control station transmits to the mobile stations information representative of the busy or idle status of the common control channel from the mobile stations by the interruption and transmission of an idle line indication signal. By reversing the signal state of the binary code transmission line to its normal state, information of the detection of transmission from the mobile stations by the base stations is transmitted to the control station, and in the control station, the idle channel indication signal is interrupted by the earliest one of the reversed signals arriving from the plurality of base stations. The start of the control signal is indicated by restoring the signal state of the binary code transmission line to its normal state. The control station resumes transmission of the idle channel indication signal upon completion of the reception of the control signal.

3 Claims, 10 Drawing Figures

CONTROL SYSTEM FOR MOBILE RADIO COMMUNICATION

BACKGROUND OF THE INVENTION

1. Field of the Invention

This invention relates to a mobile radio communication control system, in which many mobile stations perform tansmission and reception of a control signal between each of them and a fixed control station over a common two-way control channel, and, more particularly, to an idle channel control system in which, to prevent simultaneous transmission from a plurality of mobile stations, information indicative of busy or idle state of the control channel from the mobile stations to the fixed control station, that is, a reverse direction channel, is transmitted to the mobile stations through the control channel from the fixed control stations to the mobile stations, that is, a forward direction channel.

2. Description of the Prior Art

In mobile radio communication, it is customary to employ two radio frequencies as a common two-way control channel between each of many mobile stations and the fixed station. In a case where a plurality of mobile stations simultaneously start respective calls, and each performs the operation of transmitting a control signal by emitting the radio frequency wave for the reverse direction channel of the common two-way control channel, interference occurs in the common reverse direction channel, making it impossible for the fixed station to correctly receive the control signal from any of the mobile stations. To prevent this, an idle channel indication signal indicating the idle state of the reverse direction channel is always transmitted from the fixed station by the radio frequency wave of the forward direction channel of the common two-way control channel, and each mobile station transmits the control signal to start communication only when receiving the above-said idle channel indication signal.

In this case, the mobile station emits at first an electric wave for the reverse direction channel, and after a certain period of time, transmits a start signal indicating the start of the control signal and then the control signal. After the control signal has been transmitted, the electric wave for the control signal transmission is stopped, and necessary control operations are performed from instruction from the fixed station, so that communication is enabled between the mobile station and the fixed station through an electric wave for the voice signal transmission. And, upon initiation of emitting an electric wave from the mobile station, the electric wave is detected by a radio receiver of the fixed station. This detection requires a certain amount of time; namely, a detecting pulse is obtained after $T_1$ seconds from the emission of electric wave from the mobile station. This $T_1$ seconds will hereinafter be referred to as the electric wave detection time. In the electric wave detection time $T_1$ at the fixed station, the idle channel indication signal is transmitted over the forward direction channel in spite of the electric wave transmission from the mobile station, and if some other station emits an electric wave for transmitting the control signal over the reverse direction channel, interference occurs as mentioned previously. Accordingly, in order to lessen the probability of occurrence of such interference to perform the idle channel control as completely as possible, it is necessary to minimize the electric wave detecting time $T_1$.

In the above-mentioned idle channel control system, if one radio service zone is controlled by one fixed station, the transmission of the idle channel signal can be interrupted at the same time as the radio wave is detected by the fixed station. Accordingly, a time delay from the start of the transmission of the radio wave from the mobile station to the interruption of the idle channel indication signal is substantially equal to the time $T_1$.

In mobile radio communication, if the whole service area expands into a large radio service zone, since the transmitting power of each mobile station is limited, it is necessary to divide the large radio service zone into a plurality of small radio service zones and constitute the fixed station side with a plurality of base stations respectively corresponding to the small radio service zones and one control station for commonly controlling the base stations. Each base station and the control station are respectively interconnected through a plurality of fixed transmission lines. In this case, the small radio service zones are each established to have such an area that an electric wave from each of the mobile stations of each small radio service zone can be received by the corresponding base station with a sufficient electric field intensity. On the other hand, an electric wave from the side of the fixed station is transmitted with a high power from the control station so that an electric wave may be received by any of the mobile stations of the large radio service zone with a sufficient electric field intensity.

In the large radio service zone constructed as described above, if the above-said idle channel control is practiced, when each base station detects the electric wave from the mobile station of its small radio service zone, it is necessary to transmit a detection pulse indicative of the electric wave detection to the control station for controlling therein the transmission of the idle channel indication signal. Let a time necessary for transmitting the above-said detection pulse be taken as $T_2$, then there is the possibility of the aforementioned simultaneous transmission from a plurality of mobile stations for a period of time equal to the sum $(T_1 + T_2)$ of the electric wave detection time $T_1$ in the base station and the above time $T_2$. Accordingly, the time $T_2$ is also required to be as short as possible.

There are the following methods for transmitting the electric wave detection pulse:

(1) Since a fixed transmission line is usually laid between each base station and the control station for the control signal transmission from the mobile station, this transmission line is used for transmitting both of the control signal and the electric wave detection pulse.

(2) A transmission line for the exclusive use of the electric wave detection pulse is laid separately of the control signal transmission line.

With the method (1), to distinguish between the control signal and the electric wave detection pulse, the signal duration of the former is required to be substantially equal to the latter so that the detection pulse transmission time $T_2$ becomes too long, resulting in the loss of effective meaning of the idle channel control. Further, the method (2) necessitates an extra fixed transmission line, which raises the cost of the overall system. Either of the conventional methods has such a fatal defect.

A wide service area inevitably necessitates a large number of mobile stations, and naturally leads to increase probability of simultaneous transmission. In the prior art, there is no proper means for the transmission of the electric wave detection pulse, so that although the probability of simultaneous transmission from a plurality of mobile stations is high in the large radio service zone, the idle channel control for preventing the simultaneous transmission cannot be carried out.

SUMMARY OF THE INVENTION

An object of this invention is to provide a control system for mobile radio communication, which is designed so that an electric wave detection pulse obtained in a base station can be immediately transmitted to a control station over a control signal transmission line so as to perform an efficient idle channel control in a large radio service zone.

To achieve the above-said object of this invention, there is proposed a mobile radio communication control system, in which the whole service area is composed of a plurality of small radio service zones in each of which communication is sufficiently possible with the transmitting power of any of mobile stations belonging to the service zone; a base station of each of the small radio service zones and a control station for controlling the whole service area are interconnected through a binary code transmission line; and in order to prevent simultaneous transmission of the control signal from a plurality of mobile stations when the mobile stations in the whole service area achieve transmission and reception of the control signal between each of them and the control station over a common control channel, the control station transmits to the mobile stations information representative of the busy or idle status of the common control channel from the mobile stations by two states of an idle channel indication signal, for example, by interruption and transmission of the signal, information of the detection of transmission from the mobile stations by the base station is transmitted to the control station by reversing the signal state of binary code transmission channel to its normal state and, in the control station, the idle line indication signal is interrupted by the earliest one of the reversed signals arriving from the plurality of base stations. The start of the control signal is indicated by restoring the signal state of the binary code transmission line to its normal state. The control station resumes transmission of the idle channel indication signal upon completion of the reception of the control signal.

BRIEF DESCRIPTION OF THE DRAWINGS

The principle, construction and operation of this invention will become more apparent from the following detailed description taken in conjunction with the accompanying drawings.

DESCRIPTION OF THE PREFERRED EMBODIMENTS

Figure 1:
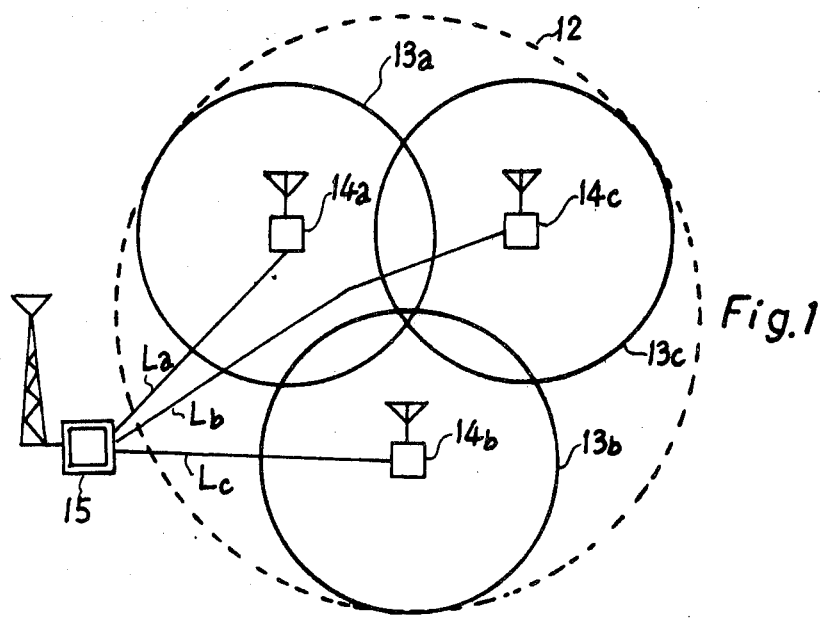
FIG. 1 is a diagram showing an example of the arrangement of the whole service area, a plurality of small radio service zones, a plurality of base stations, one control station and fixed transmission lines in this invention.

In the system of this invention, a large radio service zone 12 includes a plurality of small radio service zones 13a, 13b, 13c, . . . , and a plurality of base stations 14a, 14b, 14c, . . . are arranged respectively corresponding to the plurality of small radio service zones 13a, 13b, 13c, . . . , as shown in FIG. 1. The areas of the radio service zones 13a, 13b, 13c, . . . are selected such that electric waves emitted from mobile stations of limited transmission power respectively belonging to the small radio service zones may be received by the corresponding base stations 14a, 14b, 14c, . . . of the respective zones with sufficiently excellent signal-to-noise ratio. For collectively controlling the base stations 14a, 14b, 14c, . . . , a control station 15 is provided and fixed transmission lines $L_a$, $L_b$, $L_c$ . . . are provided between the control station 15 and the base stations 14a, 14b, 14c, . . . . A binary-coded control signal 4 such that two frequencies, for example, 1300 Hz and 2100 Hz, respectively correspond to states "1" and "0" of a binary code, is transmitted over each of the fixed transmission lines $L_a$, $L_b$, $L_c$, . . . . The control station 15 achieves high-power transmission to all of the mobile stations.

Figure 2:
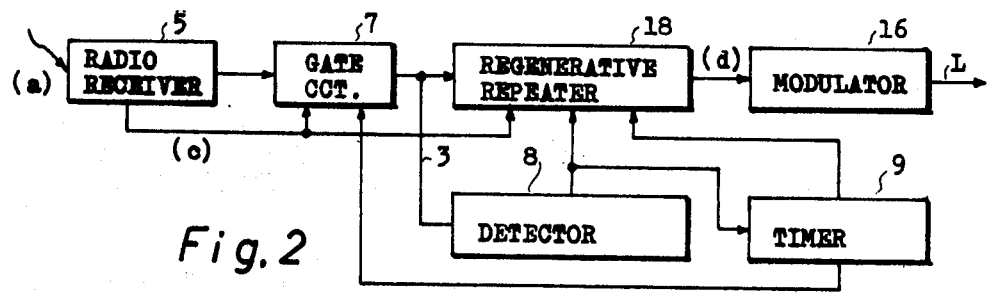
FIG. 2 is a block diagram illustrating an example of the construction of the base station for use in the system of this invention.

As shown in FIG. 2, the base stations 14a, 14b, 14c, . . . each comprises a radio receiver 5 for receiving a radio-frequency signal from the mobile station, a gate circuit 7 for controlling the passage therethrough of the output of the radio receiver 5, a detector 8 for detecting a start signal from the output of the gate circuit 7, and a timer 9 which produces a predetermined output in response to the start signal detected by the detector 8. Further, a regenerative repeater 18 is supplied with the output of the gate circuit 7 to regenerate a binary code including the control signal from the mobile station by the employment of the outputs of the radio receiver 5, the detector 8 and the timer 9. Further a modulator 16 is provided for converting the regenerated binary code including the control signal into, for example, a two tone signal, for transmission over the transmission line ($L_a$, $L_b$ or $L_c$).

Figure 3:
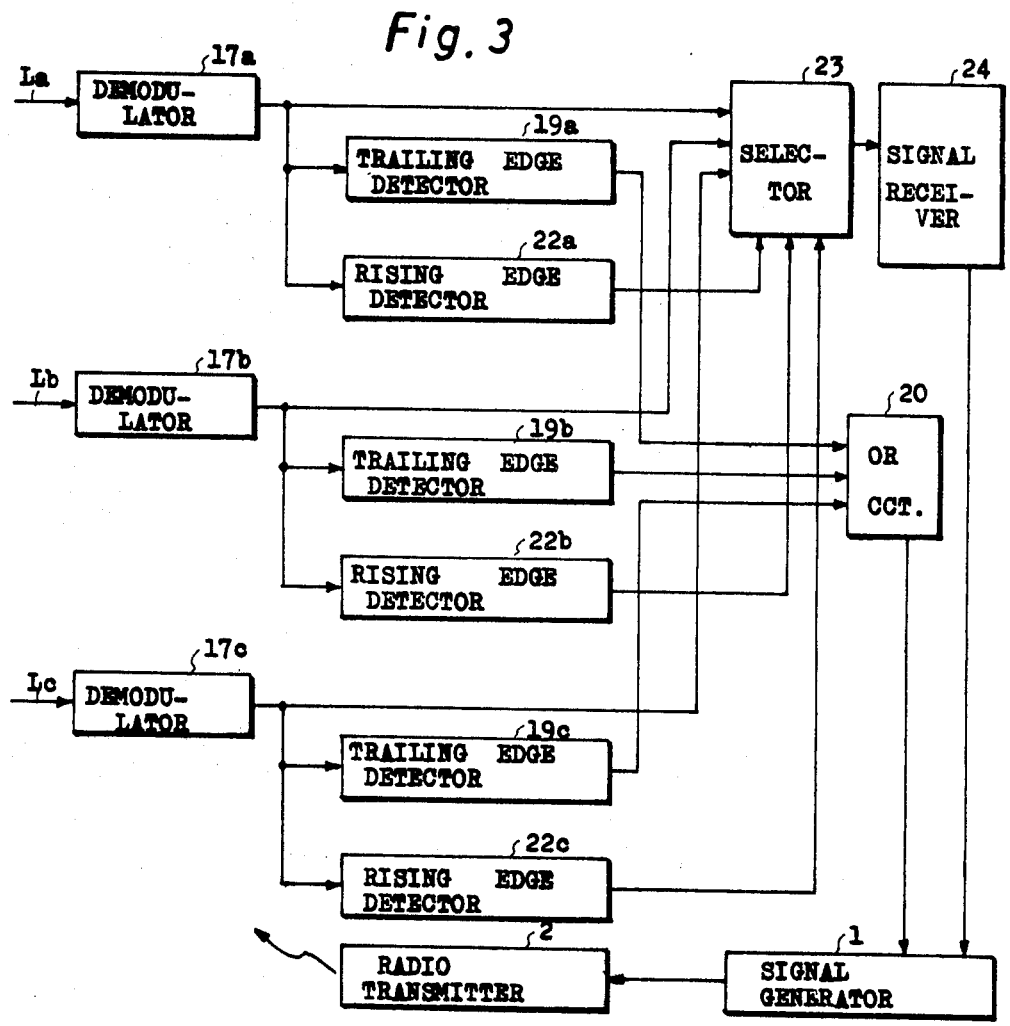
FIG. 3 is a block diagram illustrating an example of the construction of the control station for use in the system of this invention.

In the control station 15, as shown in FIG. 3, there are provided demodulators 17a, 17b and 17c for demodulating modulated signals from the fixed transmission lines to regenerate the binary code including the control signal. Further, trailing edge detectors 19a, 19b and 19c and rising edge detectors 22a, 22b and 22c are provided for respectively detecting the trailing edge and rising edge of the demodulated binary code. A selector 23 is provided for permitting the passage therethrough of the output from that of the demodulators 17a, 17b and 17c whose output is detected by the corresponding one of the rising edge detectors 22a, 22b and 22c as the start of the control signal. An OR circuit 20 is provided for obtaining the logical sum of the outputs from the trailing edge detectors 19a, 19b and 19c. A signal receiver 24 is provided for receiving the control signal from the output of the selector 23. A signal generator 1 is provided for generating an idle channel indication signal for the mobile station. A radio transmitter 2 is provided for transmitting the idle channel indication signal generated from the signal generator 1 to the mobile stations by the radio frequency wave.

In FIGS. 2 and 3, a voice signal transmission system from the mobile station to the side of the fixed station is not shown, but a voice signal transmission line is provided between each of the base stations 14a, 14b and 14c and the control station 15, and a radio receiver is provided for receiving a voice signal between each of the base stations 14a, 14b and 14c and the mobile station, and the control station 15 has a high-power radio transmitter for transmitting the voice signal. The capacity of such a voice signal transmission system is determined in accordance with the traffic density.

Referring next to the time chart of FIG. 4, the operations of the circuits shown in FIGS. 2 and 3 will be described.

Figure 4:
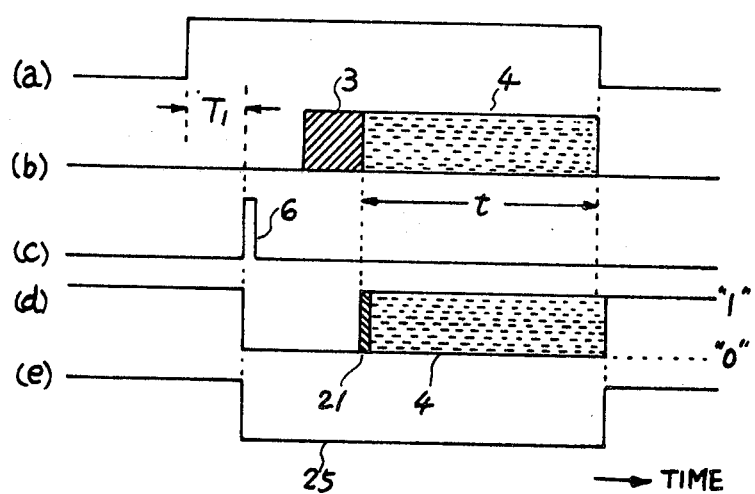
FIG. 4 is a time chart explanatory of the operation of the system of this invention.

When an electric wave from a mobile station is detected by the radio receiver 5, an electric wave detecting pulse 6 shown by a signal (c) in FIG. 4 is produced, by which the output from the signal regenerative repeater 18 is reversed to the state "0," as depicted by a signal (d) in FIG. 4. This reversal is detected by the trailing edge detector 19a, 19b or 19c of the control station 15 through the modulator 16, the fixed transmission line L (i.e., $L_a$, $L_b$ or $L_c$) and the demodulator 17 (i.e., 17a, 17b, or 17c). Since the electric wave detecting time $T_1$ in the radio receiver 5 usually varies with the receiving electric field intensity, the reversal detecting instant in each of the trailing edge detectors 19a, 19b and 19c corresponding to the base stations 14a, 14b and 14c fluctuates, and there are the possibilities that a certain one or ones of the base stations 14a, 14b and 14c cannot detect the reversal. To avoid this, the outputs from the trailing edge detectors 19a, 19b and 19c are combined to the OR circuit 20, which applies an instruction signal for stopping the transmission of an idle channel indication signal 25 to the signal generator 1 when the trailing edge is detected first from any one of the base stations 14a, 14b and 14c. As a result of this, the transmission of the idle channel indication signal 25 is stopped, as shown by a signal (e) in FIG. 4. The time from the start of the electric wave at the mobile station to the interruption of transmission of the idle channel indication signal 25 at the control station becomes the sum of the electric wave detecting time $T_1$ in the base station 14a, 14b or 14c and the trailing edge detecting time $T_3$ in the control station 15. In this case, the time $T_3$ is very shorter than the time $T_1$ and, hence, is substantially negligible.

On the other hand, in the base station 14a, 14b and 14c, the detecting pulse 6 is also applied to the gate circuit 7, and from this time, the base station 14a, 14b and 14c are put in the state of waiting for a start signal 3. Upon detection of the start signal 3 by the start signal detector 8, the signal regenerative repeater 18 transmits a start bit 21 for the fixed transmission line, and then regenerates the control signal from the mobile station with a time lag of one bit. The start bit 21 is predetermined to be the state "1." Further, at the same time as the detection of the start signal 3, the timer 9 starts to cause the regenerative repeater 18 to continue the regeneration for the control signal duration t, and thereafter the output from the regenerative repeater 18 is held at the state "1." In the control station 15, the rising edge detectors 22a, 22b and 22c detect the transition of the control signal from the state "0" to the state "1," that is, the start bit 21 for the fixed transmission line. In connection with the detection of the start bit 21, in order that the control signal reception may be achieved by the output from any of the rising edge detectors 22a, 22b 22c corresponding to the base stations 14a, 14b and 14c, the outputs from the rising edge detectors 22a, 22b and 22c are all combined to the selector 23, which selects the above-said outputs in such a manner that the control signal 4 from that of the base stations 14a, 14b and 14c having detected the start bit 21 may be applied to the signal receiver 24. Having completed the reception of the control signal, the signal receiver 24 applies to the signal generator 1 an instruction signal for resuming the transmisson of the idle channel indication signal 25 to resume the transmission of the idle channel indication signal 25 from the radio transmitter 2, as shown by a signal (e) in FIG. 4.

The foregoing description has been given in connection with the case where the control signal in the radio transmission line between the mobile station and the base station and the control signal in the fixed transmission lines $L_a$, $L_b$ and $L_c$ between the base stations 14a, 14b and 14c and the control station 15 are both in the form of a binary code. However, if only the control signal in the fixed transmission lines $L_a$, $L_b$ and $L_c$ is a binary code, the present invention is applicable regardless of the signal configuration in the mobile radio transmission section. In this case, however, it is evident that for the signal conversion in the base stations 14a, 14b and 14c and for the resumption of the transmission of the idle channel indication signal 25 stopped by the outputs from the trailing edge detectors 19a, 19b and 19c of the control station 15, a timer is necessary for the control station 15 to defer the operation by a time corresponding to the duration of the signal in the radio transmission section after the start bit detection. Further, it is apparent that states "0" and "1" of the control signal (shown by a signal (d) in FIG. 4) transmitted to the control station 15 from the base stations 14a, 14b and 14c may be reversed and that the trailing edge detectors 19a, 19b and 19c and the rising edge detectors 22a, 22b and 22c may be exchanged by each other.

Moreover, instead of representing the busy and idle states of the common control channel with the interruption (a first state) and transmission (a second state) of the idle channel indication signal, respectively, it is also possible to indicate the above-said first and second states by two frequencies of 1300 Hz and 2100 Hz respectively corresponding the above-said binary code or by two states of a two-tone signal, respectively.

Figure 5:
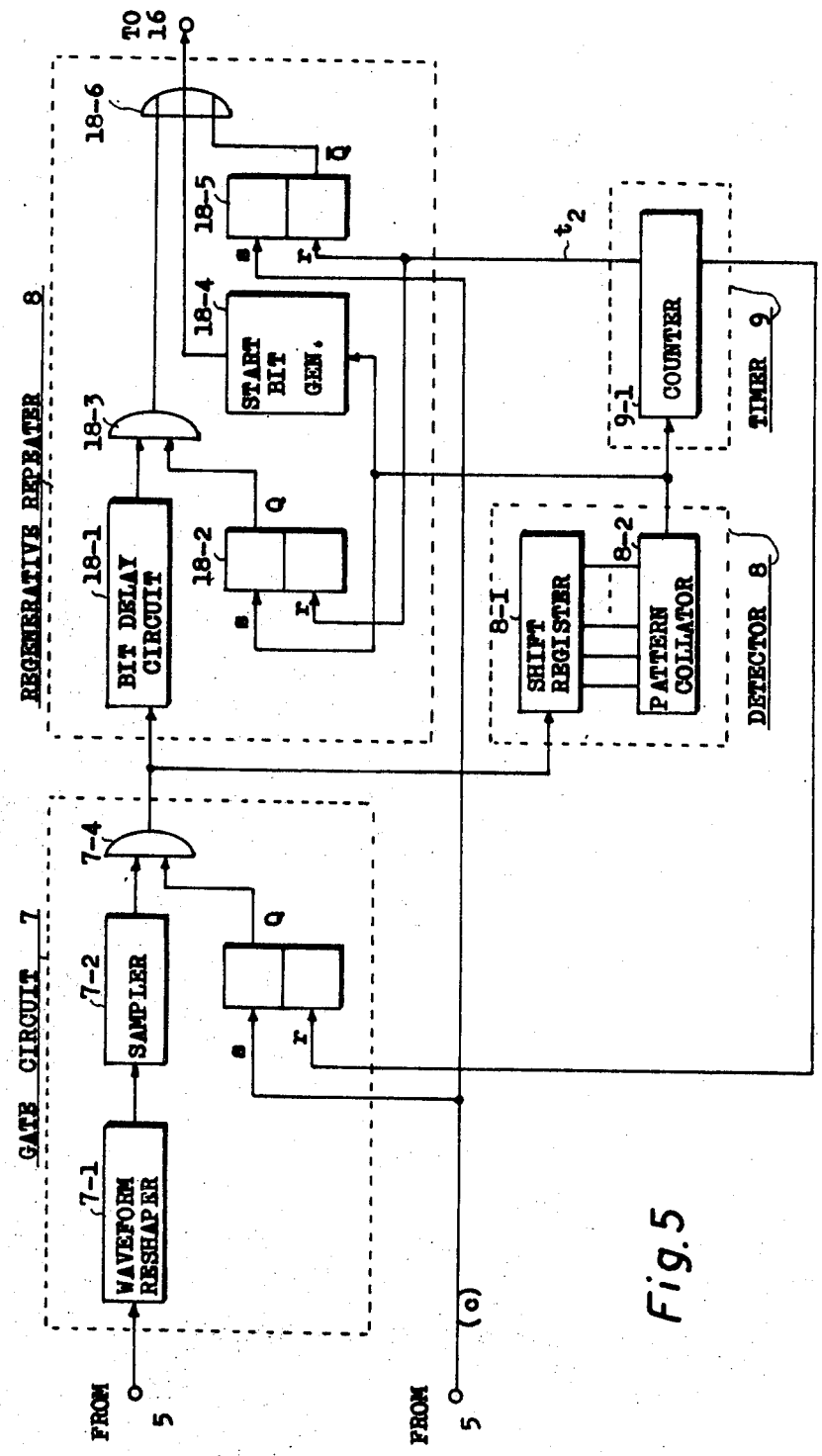
FIG. 5 is a block diagram showing in detail the construction of a part of the example of FIG. 2.

FIG. 5 is a block diagram showing more in detail the construction of the base station exemplified in FIG. 2.

The signal input from the radio receiver 5 is reshaped by a waveform reshaper 7-1 to a logical level, and sampled bit by bit in a sampler 7-2 after extraction of bit synchronization. On the other hand, by the electric wave detecting pulse from the radio receiver 5, a flip-flop 7-3 is set to open an AND gate 7-4, through which the sampled input data is applied from the gate circuit 7 to the regenerative repeater 18.

The output from the gate circuit 7 is also applied to the start signal detector 8 composed of a shift register 8-1 and a pattern collator 8-2, in which the start signal of a certain pattern is detected.

Now, the output from the regenerative repeater 18 to the modulator 16 is changed from the state "1" to the state "0" with the $\bar{Q}$ output from a flip-flop 18-5 actuated by the electric wave detecting pulse from the radio receiver 5. Next, by the start signal detection, a start bit generator 18-4 starts to transmit a predetermined start bit 21, whose first bit is assumed as the state "1," to the control circuit 15. Further, by the start signal detection, a flip-flop 18-2 is set to open an AND gate 18-3, through which is transmitted a received data delayed by a bit delay circuit 18-1 by the length of the start bit, that is, the aforementioned control signal 4. Moreover, upon detection of the start signal, the timer 9 formed by a counter 9-1 starts and resets the flip-flop 7-3 after the lapse of time corresponding to the duration $t_1$ of the control signal (refer to FIG. 4) to close the AND gate 7-4, thereby to prevent application of noises from the radio receiver 5. Then, after the lapse of a time $t_2$ until completion of the signal regeneration (refer to FIG. 4), the flip-flop 18-5 is reset to restore the transmitted output to the modulator 16 to the state "1." With the above, the signal (d) in FIG. 4 is obtained as the output to the modulator 16.

In FIGS. 2 and 5, the base station is shown to have the construction of the system which detects the electric wave by the radio receiver 5, but it is also possible to employ a system of detecting the electric wave by the signal output from the radio receiver 5.

Figure 6:
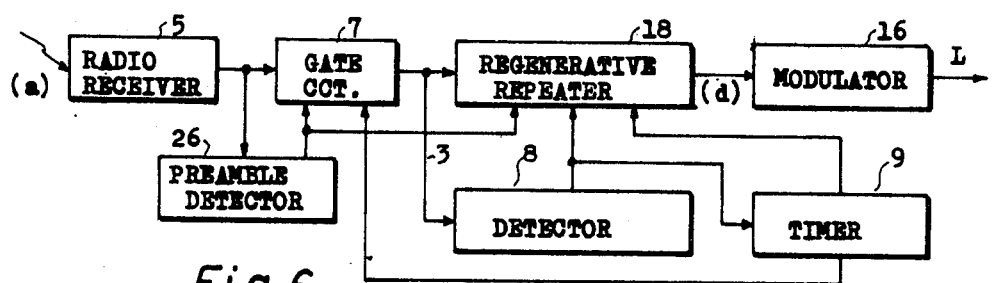
FIG. 6 is a block diagram illustrating a modified form of the construction of the example shown in FIG. 2.
Figure 7:
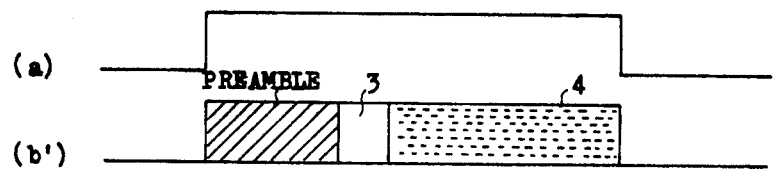
FIG. 7 is a time chart explanatory of the operation of the example shown in FIG. 6.

FIG. 6 illustrates the construction of the base station in the latter case. The construction of FIG. 6 is exactly identical with that of FIG. 2 except ony in that the electric wave detecting pulse is derived from a preamble detector 26. In this case, the mobile station transmits a pattern "1010 . . ." as a preamble from the time of the electric wave detection to the time immediately before the start signal transmission, as depicted in FIG. 7. The pattern is detected by the preamble detector 26.

Figure 8:
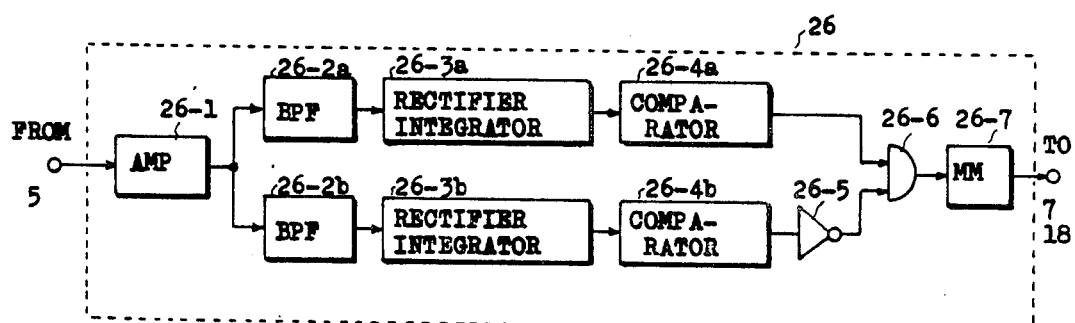
FIG. 8 is a block diagram showing an example of a preamble detector used in FIG. 6.

The internal construction of the preamble detector 26 is illustrated in FIG. 8. The signal input from the radio receiver 5 is applied to an amplifier 26-1, and then branched to a signal component detector (composed of a band-pass filter 26-2a, a rectifier-integrator 26-3a and a comparator 26-4a) and a noise component detector (composed of a band-pass filter 26-2b, a rectifier-integrator 26-3b and a comparator 26-4b). The outputs from the both detectors have such a logic operation that only when the signal components are detected by a NOT circuit 26-5 and an AND gate 26-6 but no noises detected, the output from the AND gate 26-6 becomes the state "1," and when the output alters from the state "0" to the state "1," the electric wave detection pulse is obtained and transmitted to the gate circuit 7 and the regenerative repeater 18 through a monostable multivibrator 26-7.

Figure 9:
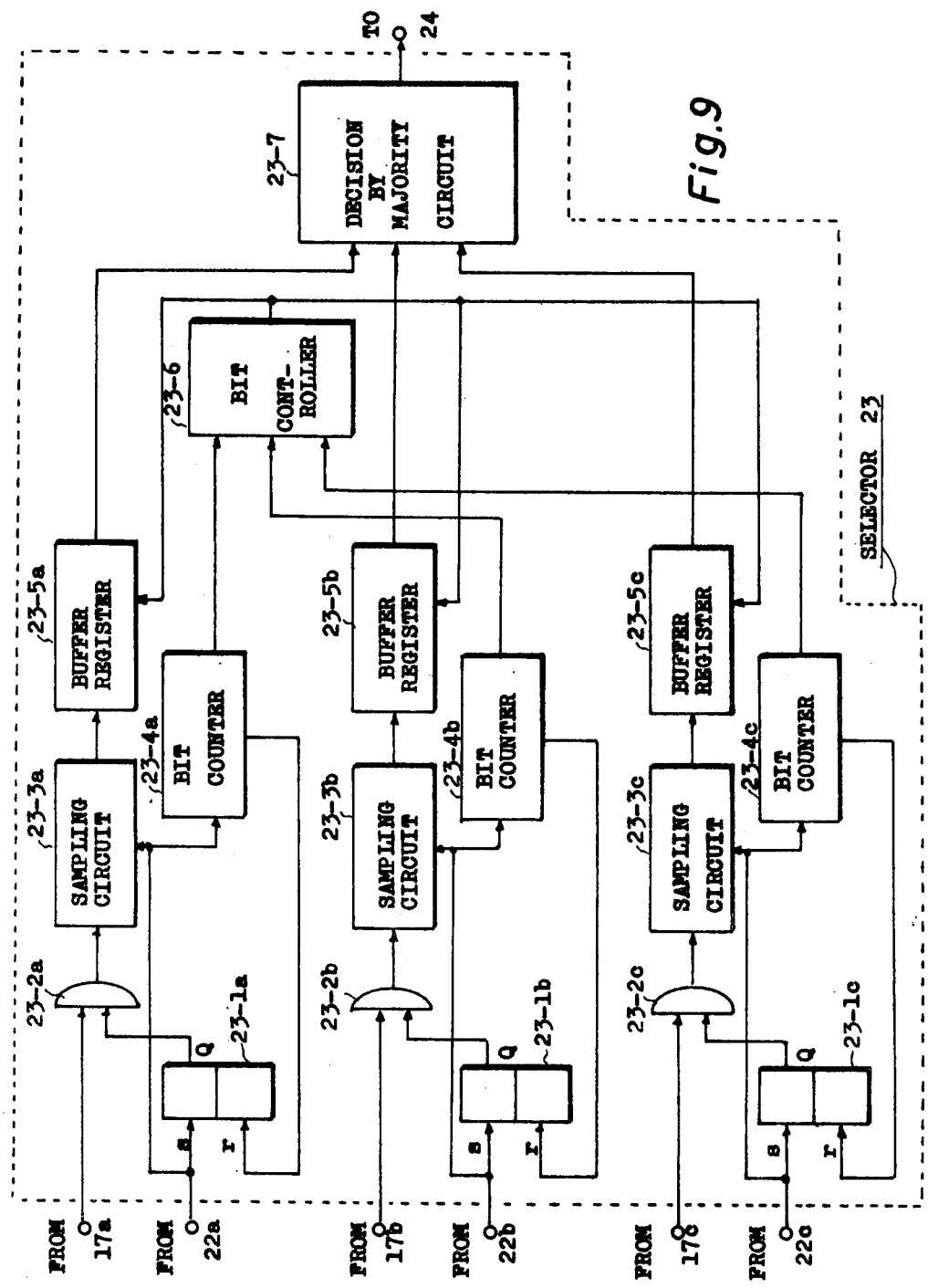
FIG. 9 is a block diagram illustrating an example of a selector used in FIG. 3.

FIG. 9 shows in block form an example of the construction of the selector 23 used in FIG. 3. By the input from the rising edge detector 22a, 22b or 22c, a flip-flop 23-1a, 23-1b or 23-1c is set to open an AND gate 23-2a, 23-2b or 23-2c, thereby permitting the application of the input signal from the demodulator 17a, 17b or 17c. At the same time as the application of the input signal to this selector 23, a sampling circuit 23-3a, 23-3b or 23-3c and a bit counter 23-4a, 23-4b, or 23-4c start, and the sampled data is temporarily stored in a buffer register 23-5a, 23-5b or 23-5c. The counting information of the bit counters 23-4a, 23-4b and 23-4c is applied to a bit controller 23-6, in which the outputs from the respective buffer registers 23-5a, 23-5b and 23-5c are controlled, thereby transmitting the data of the s same bit number to a decision by majority circuit 23-7 from the buffer registers 23-5a, 23-5b and 23-5c corresponding to the base station. The decision by majority circuit 23-7 achieves a decision by majority operation bit by bit in connection with the input signal from each base station and applies the results of the operation to the signal receiver 24 one after another.

Figure 10:
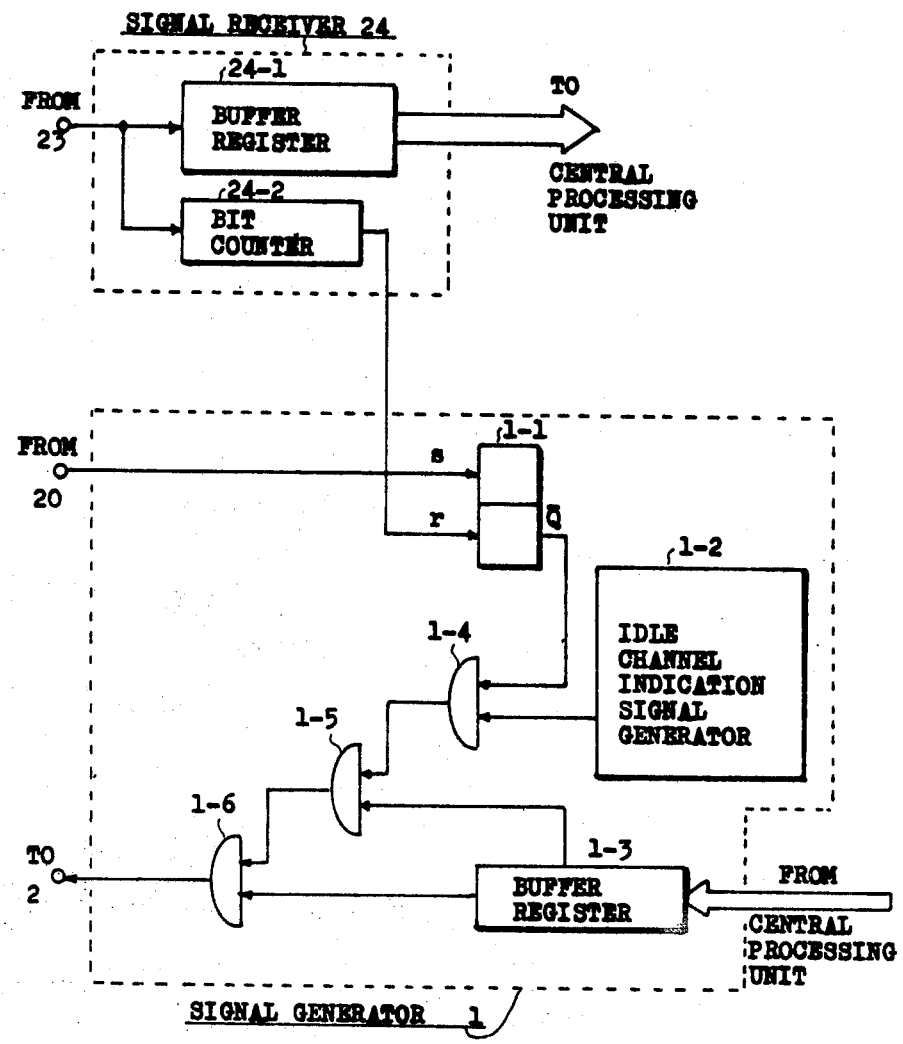
FIG. 10 is a block diagram showing an example of each of a signal receiver and a signal generator used in FIG. 3.

FIG. 10 is a block diagram showing an example of the internal construction of each of the signal receiver 24 and the signal generator 1.

The input data from the selector 23 is stored in a buffer register 24-1 and then applied to a central processing unit to achieve a control operation in accordance with control information. Simultaneously with this, a bit counter 24-2 operates to apply a signal reception completion pulse to the signal generator 1.

In the signal generator 1, a flip-flop 1-1 is set by a trailing edge detecting pulse from the OR gate 20 to close an AND gate 1-4, for stopping transmission of the idle channel indication signal from an idle channel indication signal generator 1-2. Further, by the signal reception completion pulse from the signal receiver 24, the flip-flop 1-1 is reset to open the AND gate 1-4, thus resuming the transmission of the idle channel indication signal.

In addition to the idle channel indication signal, a control signal for designating a speech channel is transmitted from the control station to the mobile station. This control signal is transmitted from the central processing unit through a buffer register 1-3 and an OR gate 1-6. During the transmission of the control signal, the AND gate 1-5 is closed to stop the transmission of the idle channel indication signal 25.

As has been described in the foregoing, with the present invention, the electric wave detecting pulse obtained in each base station can be immediately transmitted to the control station, and the idle channel control in the control station produces exactly the same effect as that obtainable in the case of the ordinary system described previously. Further, even if the electric wave detecting pulse and the control signal from the mobile station are transmitted together over the fixed transmission line for the control signal transmission, there is no need of separately providing a transmission line solely for the electric wave detecting pulse, since the control station is capable of receiving and controlling the electric wave detecting pulse and the control signal completely independently of each other. Accordingly, this invention has an advantage that many mobile stations can be accommodated by efficiently utilizing the control channel of the radio frequency under a wide service area at a minimum cost.

What I claim is:

1. A control system for mobile radio communication comprising:
    a number of mobile stations, each transmitting a control signal indicative of transmission by a first common radio frequency wave;
    a plurality of base stations, each disposed in one of a plurality of small radio service zones respectively having an area in which communication can be sufficiently achieved with a radio transmission power of each mobile station, each base station having means for receiving the control signal from the mobile station in the corresponding one of the small radio service zones and means for regenerating the control signal in the form of a binary code;

a plurality of fixed transmission lines, each transmitting the binary code regenerated by each of the plurality of base stations; and a control station connected to each of the plurality of fixed transmission lines for transmitting, in response to the binary code, an idle channel indication signal to each of the mobile stations in the whole service area including all of the plurality of small radio service zones at a second common radio frequency wave, the idle channel indication signal having first and second states indicative of busy and idle states of the first common radio frequency wave, respectively, each of said base stations including means for applying to the control station information indicative of the detection of transmission from one of the mobile stations in the small radio service zone of the base station by reversing the state of the binary code transmitted therefrom over the corresponding one of the fixed transmission lines, and said control station including means for establishing the idle channel indication signal to the first state in accordance with the reversal of the earliest one of the binary codes arriving from the base stations, and means for detecting initiation of restoration of the binary code control signal to its normal state, and means for changing the idle channel indication signal into the second state upon completion of reception of said control signal.

2. A control system for mobile radio communication according to claim 1, in which interruption and transmission of the idle channel indication signal corresponds to the first and second states, respectively.

3. A control system for mobile radio communication according to claim 1, in which said idle channel indication signal assumes two states detectable at each of said mobile stations as said first state and said second state, respectively.

* * * * *